(12) United States Patent
Seto

(10) Patent No.: US 10,139,301 B2
(45) Date of Patent: Nov. 27, 2018

(54) PRESSURE SENSOR CHIP INCLUDING FIRST AND SECOND ANNULAR SHAPE GROOVES IN A NON-BONDING REGION OF A HOLDING MEMBER FOR A SENSOR DIAPHRAGM

(71) Applicant: Azbil Corporation, Chiyoda-ku (JP)

(72) Inventor: Yuki Seto, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 115 days.

(21) Appl. No.: 15/254,911

(22) Filed: Sep. 1, 2016

(65) Prior Publication Data

US 2016/0370244 A1    Dec. 22, 2016

Related U.S. Application Data

(63) Continuation of application No. PCT/JP2015/056314, filed on Mar. 4, 2015.

(30) Foreign Application Priority Data

Mar. 4, 2014 (JP) ................. 2014-041266

(51) Int. Cl.
*G01L 7/08* (2006.01)
*G01L 19/06* (2006.01)
*G01L 9/00* (2006.01)
*G01L 13/02* (2006.01)

(52) U.S. Cl.
CPC ........ *G01L 19/0627* (2013.01); *G01L 9/0051* (2013.01); *G01L 13/025* (2013.01); *G01L 19/0618* (2013.01)

(58) Field of Classification Search
None
See application file for complete search history.

(56) References Cited

U.S. PATENT DOCUMENTS 3,812,816 A * 5/1974 Juhasz ................. B01D 35/143
116/220
4,332,000 A * 5/1982 Petersen ............... G01L 9/0073
257/419
2005/0235752 A1* 10/2005 Mikkelsen ........... G01L 9/0051
73/715

(Continued)

FOREIGN PATENT DOCUMENTS

JP    2005-69736    3/2005

*Primary Examiner* — Andre Allen
(74) *Attorney, Agent, or Firm* — Oblon, McClelland, Maier & Neustadt, L.L.P.

(57) ABSTRACT

A pressure sensor chip that includes a sensor diaphragm; and a first holding member and a second holding member bonded respectively to first surface and the second surface of the sensor diaphragm with peripheral portions thereof being positioned to face each other, each of the first holding member and the second holding member has a pressure introduction hole, the first holding member includes a non-bonding region formed inside the first holding member and communicating with a periphery of the pressure introduction hole, first and second grooves each has an annular shape formed in a peripheral edge portion of the non-bonding region, an end of the second groove is positioned closer to the pressure introduction hole than an end of the first groove, and the second holding member includes a recess.

13 Claims, 7 Drawing Sheets

(56) References Cited

U.S. PATENT DOCUMENTS

2013/0239694 A1* 9/2013 Seto ............... G01L 13/025
                                                    73/720
2017/0176276 A1* 6/2017 Tokuda ............ G01L 13/025
2017/0176277 A1* 6/2017 Tokuda ............ G01L 13/025

* cited by examiner

… (1)

PRESSURE SENSOR CHIP INCLUDING FIRST AND SECOND ANNULAR SHAPE GROOVES IN A NON-BONDING REGION OF A HOLDING MEMBER FOR A SENSOR DIAPHRAGM

CROSS-REFERENCE TO RELATED APPLICATIONS

This application is a continuation of International Application No. PCT/JP2015/056314, filed Mar. 4, 2015, which claims the benefit of Japanese Patent Application No. 2014-041266, filed Mar. 4, 2014, the entire contents of which are incorporated herein by reference.

FIELD

The present disclosure relates to a pressure sensor chip using a sensor diaphragm that outputs a signal depending on a difference between pressures received by a first surface and a second surface of the sensor diaphragm, and more particularly to a pressure sensor chip in which, for example, a resistance strain gauge is formed on a thin-plate diaphragm that is displaced upon receiving pressure, and the pressure applied to the diaphragm is detected from change in a resistance value of the resistance strain gauge formed on the diaphragm.

BACKGROUND

A differential pressure sensor chip including a pressure sensor chip using a sensor diaphragm that outputs a signal depending on a difference between pressures received by a first surface and a second surface of the sensor diaphragm, has been employed so far as a differential pressure sensor for industrial purposes.

In the above differential pressure sensor, measuring pressures applied to pressure receiving diaphragms on a higher pressure side and a lower pressure side are introduced to one surface and the other surface of the sensor diaphragm through enclosed liquids each serving as a pressure transmission medium, and a strain of the sensor diaphragm is detected as chance in a resistance value of a resistance strain gauge, for example. The change in the resistance value is converted to and taken out as an electrical signal.

The differential pressure sensor of the above-mentioned type is used, for example, to measure the height of a liquid level by detecting a difference in pressure between two upper and lower positions inside a sealed tank storing a fluid to be measured, such as a high-temperature tube reactor in an oil refinery plant.

FIG. 10 illustrates a structure of a related-art differential pressure sensor in a schematic form. In this differential pressure sensor 100, a pressure sensor chip 1 including a sensor diaphragm (not illustrated) is assembled in a meter body 2. The sensor diaphragm in the pressure sensor chip 1 is made of, e.g., silicon or glass. A resistance strain gauge is formed on a surface of the diaphragm in the shape of a thin plate. The meter body 2 is constituted by a main body portion 3 made of metal, and a sensor portion 4. Barrier diaphragms (pressure receiving diaphragms) 5a and 5b constituting a pair of pressure receiving portions are disposed respectively in lateral surfaces of the main body portion 3. The pressure sensor chip 1 is assembled in the sensor portion 4.

In the meter body 2, the pressure sensor chip 1 assembled in the sensor portion 4 and the barrier diaphragms 5a and 5b disposed in the main body portion 3 are held in communication with each other through pressure buffer chambers 7a and 7b, respectively, which are partitioned by a center diaphragm 6 having a large diameter. Pressure transmission media 9a and 9b each being silicone oil, for example, are enclosed in communication paths 8a and 8b that interconnect the pressure sensor chip 1 and the barrier diaphragms 5a and 5b, respectively.

The reason why the pressure medium, e.g., silicone oil, is required resides in preventing foreign matters inside a medium as a measurement target from adhering to the sensor diaphragm, and in separating the pressure receiving diaphragm having corrosion resistance and the sensor diaphragm having stress (pressure) sensitivity from each other, thus preventing corrosion of the sensor diaphragm.

In the above differential pressure sensor 100, as seen from FIG. 11A schematically illustrating an operation mode in a steady state, first fluid pressure (first measuring pressure) Pa from a process is applied to the barrier diaphragm 5a, and second fluid pressure (second measuring pressure) Pb from a process is applied to the barrier diaphragm 5b. Accordingly, the barrier diaphragms 5a and 5b are displaced, and the applied pressures Pa and Pb are introduced respectively to one surface and the other surface of the sensor diaphragm in the pressure sensor chip 1 through the pressure buffer chambers 7a and 7b, which are partitioned by the center diaphragm 6, with the aid of the pressure transmission media 9a and 9b. As a result, the sensor diaphragm in the pressure sensor chip 1 exhibits a displacement corresponding to a differential pressure ΔP between the pressures Pa and Pb introduced to the sensor diaphragm.

On the other hand, when overpressure Pover is applied to the barrier diaphragm 5a, for example, the barrier diaphragm 5a is greatly displaced as illustrated in FIG. 11B, and the center diaphragm 6 is responsively displaced so as to absorb the overpressure Pover. When the displacement of the barrier diaphragm 5a is restricted upon contacting a bottom surface (overpressure protective surface) of a recess 10a formed in the meter body 2, further transmission of the differential pressure ΔP to the sensor diaphragm through the barrier diaphragm 5a is prevented. When the overpressure Pover is applied to the barrier diaphragm 5b, the barrier diaphragm 5b is brought into contact with a bottom surface (overpressure protective surface) of a recess 10b formed in the meter body 2 and the displacement of the barrier diaphragm 5b is restricted, whereby further transmission of the differential pressure ΔP to the sensor diaphragm through the barrier diaphragm 5b is prevented, as in the case where the overpressure Pover is applied to the barrier diaphragm 5a. As a result, damage of the pressure sensor chip 1 due to application of the overpressure Pover, i.e., damage of the sensor diaphragm in the pressure sensor chip 1, is avoided.

In the above differential pressure sensor 100, because the pressure sensor chip 1 is incorporated inside the meter body 2, the pressure sensor chip 1 can be protected against external corrosive environments, such as a process fluid. However, it is unavoidable for the differential pressure sensor 100 to have a large size in its external shape because of the structure of protecting the pressure sensor chip 1 against the overpressure Pover with the provision of the recesses 10a and 10b that function to restrict the displacements of the center diaphragm 6 and the barrier diaphragms 5a and 5b.

In consideration of the above point, there is provided a structure in which a first stopper member and a second stopper member are disposed in a pressure sensor chip, and in which recesses of the first stopper member and the second stopper member are positioned to face one surface and the other surface of the sensor diaphragm, respectively, to avoid excessive displacements of the sensor diaphragm when overpressure is applied, thereby preventing damage and breakage of the sensor diaphragm (see, e.g., Patent Literature (PTL) 1).

FIG. 12 is a schematic representation of a pressure sensor chip employing the structure disclosed in PTL 1. In FIG. 12, reference sign 51-1 denotes a sensor diaphragm, 51-2 and 51-3 denote respectively first and second stopper members bonded to each other with the sensor diaphragm 51-1 interposed therebetween, and 51-4 and 51-5 denote first and second bases bonded to the stopper members 51-2 and 51-3, respectively. The stopper members 51-2 and 51-3 and the bases 51-4 and 51-5 are each made of, e.g., silicon or glass.

In the disclosed pressure sensor chip 51, recesses 51-2a and 51-3a are formed in the stopper members 51-2 and 51-3, respectively. The recess 51-2a in the stopper member 51-2 is positioned to face one surface of the sensor diaphragm 51-1, and the recess 51-3a in the stopper member 51-3 is positioned to face the other surface of the sensor diaphragm 51-1. The recesses 51-2a and 51-3a have curved surfaces (aspherical surfaces) corresponding to displacements of the sensor diaphragm 51, and pressure introduction holes (pressure guide holes) 51-2b and 51-3b are formed at the bottoms of the recesses 51-2a and 51-3a, respectively. Moreover, pressure introduction holes (pressure guide holes) 51-4a and 51-5a are formed in the bases 51-4 and 51-5 at positions corresponding to the pressure introduction holes 51-2b and 51-3b in the stopper members 51-2 and 51-3, respectively.

In the case of employing the pressure sensor chip 51, when the sensor diaphragm 51-1 is displaced upon application of overpressure to the one surface of the sensor diaphragm 51-1, the displaced surface of the sensor diaphragm 51-1 is entirely received by the curved surface of the recess 51-3a in the stopper member 51-3. Furthermore, when the sensor diaphragm 51-1 is displaced upon application of overpressure to the other surface of the sensor diaphragm 51-1, the displaced surface of the sensor diaphragm 51-1 is entirely received by the curved surface of the recess 51-2a in the stopper member 51-2.

As a result, an excessive displacement caused upon application of overpressure to the sensor diaphragm 51-1 is prevented, and stresses are avoided from concentrating at a peripheral edge portion of the sensor diaphragm 51-1. It is hence possible to effectively prevent unintended breakage of the sensor diaphragm 51-1, which would be caused by the application of overpressure, and to increase overpressure protection operating pressure (i.e., withstanding pressure). Moreover, in the structure illustrated in FIG. 10, the size of the meter body 2 can be reduced with the modification of eliminating the center diaphragm 6 and the pressure buffer chambers 7a and 7b, and of directly introducing the measuring pressures Pa and Pb to the sensor diaphragm 51-1 from the barrier diaphragms 5a and 5b, respectively.

CITATION LIST

Patent Literature

PTL 1: Japanese Unexamined Patent Application Publication No. 2005-69736

SUMMARY

According to one aspect of the disclosure, there is provided a pressure sensor chip, including: a sensor diaphragm that outputs a signal depending on a difference between pressures received by a first surface and a second surface of the sensor diaphragm; and a first holding member and a second holding member bonded respectively to the first surface and the second surface of the sensor diaphragm with peripheral portions thereof being positioned to face each other, each of the first holding member and the second holding member having a respective pressure introduction hole through which pressure to be measured is applied to the sensor diaphragm, wherein the first holding member includes a non-bonding region formed inside the first holding member, the non-bonding region being parallel to a pressure-receiving surface of the sensor diaphragm and communicating with a periphery of the pressure introduction hole of the first holding member, defining a first side of a plane including the non-bonding region inside the first holding member as a direction opposite to the sensor diaphragm with interposition of the plane including the non-bonding region inside the first holding member therebetween and a second side of the plane including the non-bonding region inside the first holding member as a direction approaching the sensor diaphragm with interposition of the plane including the non-bonding region inside the first holding member therebetween, the first holding member includes first and second grooves each having an annular shape and concavely formed in a peripheral edge portion of the non-bonding region inside the first holding member on the first side and the second side of the plane including the non-bonding region inside the first holding member, respectively, in continuation with the non-bonding region, each of cross-sectional shapes of the first groove and the second groove taken perpendicularly to a groove-extending direction includes a circular arc, the first groove and the second groove are formed such that an end of the cross-sectional shape of the second groove is positioned closer to the pressure introduction hole of the first holding member than an end of the cross-sectional shape of the first groove, and the second holding member includes a recess formed in a surface thereof, the surface being bonded to the second surface of the sensor diaphragm.

DETAILED DESCRIPTION

Technical Problem

Figure 12:
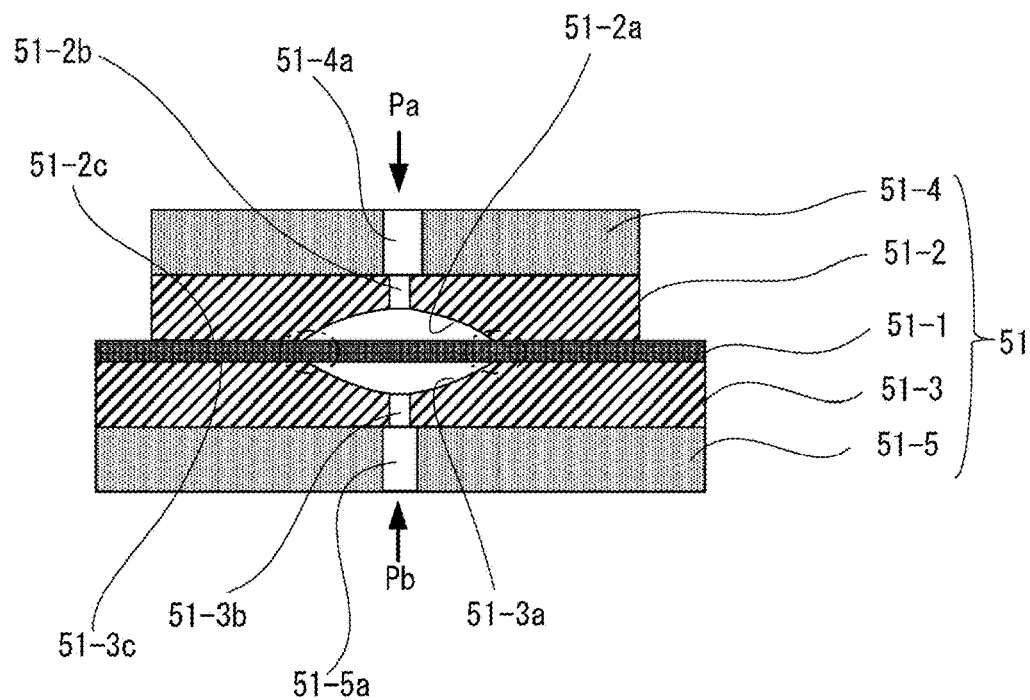
FIG. 12 is a schematic representation of a sensor chip employing the structure disclosed in PTL 1.

In the structure of the pressure sensor chip 51 illustrated in FIG. 12, however, peripheral portions 51-2c and 51-3c of the stopper members 51-2 and 51-3 are entirely bonded to the one surface and the other surface of the sensor diaphragm 51-1, respectively. More specifically, the peripheral portion 51-2c of the stopper member 51-2, which surrounds the recess 51-2a, is positioned to confront the one surface of the sensor diaphragm 51-1, and an entire region of the confronting peripheral portion 51-2c is directly bonded to the one surface of the sensor diaphragm 51-1. Furthermore, the peripheral portion 51-3c of the stopper member 51-3, which surrounds the recess 51-3a, is positioned to confront the other surface of the sensor diaphragm 51-1, and an entire region of the confronting peripheral portion 51-3c is directly bonded to the other surface of the sensor diaphragm 51-1.

In the case of the above-described structure, when excessive pressure exceeding the overpressure protection operating pressure (i.e., withstanding pressure), which is specified by the stopper member 51-2, is applied, the sensor diaphragm 51-1 is flexed to contact the bottom of the recess 51-2a in the stopper members 51-2. Thereafter, the sensor diaphragm 51-1 is further flexed together with the stopper member 51-2 while keeping the above-mentioned state. This leads to a problem that, because the sensor diaphragm 51-1 is in a state restricted at both the surfaces thereof near its edges (i.e., at locations surrounded by one-dot-chain lines in FIG. 12) on the pressure-applied side where tensile stress is maximally generated, stresses are concentrated at those locations and the expected withstanding pressure cannot be ensured.

Furthermore, if opening sizes of the recesses 51-2a and 51-3a in the stopper members 51-2 and 51-3 have deviations attributable to a manufacturing process, positional deviations are generated at the restricted locations of the sensor diaphragm 51-1, and stresses is more significantly concentrated due to influences of those positional deviations in some cases. In such a case, there is a possibility that further reduction of the withstanding pressure may occur due to additional concentration of stresses, which are caused by abnormal contact of the sensor diaphragm 51-1 with the recess bottom.

An object of the present disclosure is to provide a pressure sensor chip capable of reducing generation of stresses attributable to a sensor diaphragm that is in a restricted state, preventing the stresses from concentrating at a diaphragm edge, and ensuring the expected withstanding pressure.

Solution to Problem

The present disclosure provides a pressure sensor chip including a sensor diaphragm that outputs a signal depending on a difference between pressures received by one surface and the other surface of the sensor diaphragm, and first and second holding members bonded respectively to the one surface and the other surface of the sensor diaphragm with peripheral portions thereof being positioned to face each other, each of the first and second holding members having a pressure introduction hole through which measuring pressure is introduced to the sensor diaphragm, wherein the first holding member includes a non-bonding region formed inside the first holding member parallel to a pressure receiving surface of the sensor diaphragm and communicating with a periphery of the pressure introduction hole, and, on an assumption that one side is defined as a direction opposite to the sensor diaphragm with interposition of a plane including the non-bonding region inside the first holding member therebetween and the other side is defined as a direction approaching the sensor diaphragm with interposition of the plane including the non-bonding region inside the first holding member therebetween, first and second grooves each having an annular shape and concavely formed in a peripheral edge portion of the non-bonding region inside the first holding member on the one side and the other side, respectively, in continuation with the non-bonding region, wherein each of cross-sectional shapes of the first groove and the second groove taken perpendicularly to a groove extending direction includes a circular arc, wherein the first groove and the second groove are formed such that an end of the cross-sectional shape of the second groove is positioned closer to the pressure introduction hole than an end of the cross-sectional shape of the first groove, and wherein the second holding member includes a recess formed in a surface thereof, the surface being bonded to the other surface of the sensor diaphragm.

Advantageous Effects of Disclosure

According to the present disclosure, the non-bonding region in communication with the periphery of the pressure introduction hole is provided inside the first holding member, and the non-bonding region inside the first holding member is formed in part of the plane parallel to the pressure receiving surface of the sensor diaphragm. Therefore, the non-bonding region inside the first holding member provides a pressure receiving surface to suppress a force that acts on the first holding member in an opposite direction, thereby preventing a gap from being generated at a diaphragm edge and reducing generation of stresses attributable to the sensor diaphragm that is held in a restricted state. As a result, concentration of the stresses at the diaphragm edge can be avoided, and the expected withstanding pressure can be ensured.

Furthermore, according to the present disclosure, on an assumption that one side is defined as the direction opposite to the sensor diaphragm with interposition of the plane including the non-bonding region inside the first holding member therebetween and the other side is defined as the direction approaching the sensor diaphragm with interposition of the plane including the non-bonding region inside the first holding member therebetween, the first holding member includes the first and second grooves each having an annular shape and concavely formed in the peripheral edge portion of the non-bonding region inside the first holding member on the one side and the other side, respectively, in continuation with the non-bonding region. Each of the cross-sectional shapes of the first groove and the second groove taken perpendicularly to the groove extending direction includes a circular arc, and the first groove and the second groove are formed such that the end of the cross-sectional shape of the second groove is positioned closer to the pressure introduction hole than the end of the cross-sectional shape of the first groove. Therefore, stresses are distributed in the annular grooves, and distribution of the stresses in the annular grooves is balanced. As a result, a maximum level of the generated stresses can be suppressed, and the withstanding pressure can be further increased.

First, basic features of a pressure sensor chip according to the present disclosure are described.

The pressure sensor chip according to the present disclosure includes a sensor diaphragm that outputs a signal depending on a difference between pressures received by one surface and the other surface of the sensor diaphragm, and a first holding member and a second holding member bonded respectively to the one surface and the other surface of the sensor diaphragm with peripheral portions thereof being positioned to face each other, each of the first holding member and the second holding member having a pressure introduction hole through which measuring pressure is introduced to the sensor diaphragm, wherein the first holding member includes a non-bonding region formed inside the first holding member parallel to a pressure receiving surface of the sensor diaphragm and communicating with a periphery of the pressure introduction hole, and, on an assumption that one side is defined as a direction opposite to the sensor diaphragm with interposition of a plane including the non-bonding region inside the first holding member therebetween and the other side is defined as a direction approaching the sensor diaphragm with interposition of the plane including the non-bonding region inside the first holding member therebetween, first and second grooves each having an annular shape and concavely formed in a peripheral edge portion of the non-bonding region inside the first holding member on the one side and the other side, respectively, in continuation with the non-bonding region, wherein each of cross-sectional shapes of the first groove and the second groove taken perpendicularly to a groove extending direction includes a circular arc, wherein the first groove and the second groove are formed such that an end of the cross-sectional shape of the second groove is positioned closer to the pressure introduction hole than an end of the cross-sectional shape of the first groove, and the second holding member includes a recess formed in a surface thereof, the surface being bonded to the other surface of the sensor diaphragm.

In the pressure sensor chip according to the present disclosure, when higher measuring pressure is applied to the one surface of the sensor diaphragm, the sensor diaphragm is flexed toward the second holding member, thus causing a gap to be about to generate at a diaphragm edge. In such a case, according to the present disclosure, since the measuring pressure is introduced to the non-bonding region as well, which is provided inside the first holding member, through the pressure introduction hole, the non-bonding region provides a pressure receiving surface for the measuring pressure such that the first holding member is flexed and deformed following both the second holding member and the diaphragm in the same direction, thus preventing a gap from being generated at the diaphragm edge. As a result, generation of stresses attributable to the sensor diaphragm held in the restricted state is reduced, and concentration of the stresses on the diaphragm is avoided.

Furthermore, in the pressure sensor chip according to the present disclosure, on an assumption that one side is defined as the direction opposite to the sensor diaphragm with interposition of the plane including the non-bonding region inside the first holding member therebetween and the other side is defined as the direction approaching the sensor diaphragm with interposition of the plane including the non-bonding region inside the first holding member therebetween, the first holding member includes the first and second grooves each having an annular shape and concavely formed in the peripheral edge portion of the non-bonding region inside the first holding member on the one side and the other side, respectively, in continuation with the non-bonding region. With those features, stresses are distributed in the annular grooves in continuation with the non-bonding region, and higher withstanding pressure can be ensured.

Moreover, in the pressure sensor chip according to the present disclosure, each of the cross-sectional shapes of the first groove and the second groove taken perpendicularly to the groove extending direction includes a circular arc, the cross-sectional shape of the first groove taken perpendicularly to the groove extending direction includes a circular arc equal to or greater than a semicircle, and the cross-sectional shape of the second groove taken perpendicularly to the groove extending direction includes a circular arc equal to or smaller than a semicircle. With those features, a thickness of the first holding member can be decreased, and a following effect of the first holding member can be increased. It is hence possible to decrease the thickness of the first holding member, to reduce an area of the non-bonding region inside the first holding member, and to realize size reduction of the chip.

In the pressure sensor chip according to the present disclosure, when a surface of the sensor diaphragm to receive the measuring pressure on the higher pressure side is uniquely determined in design, the one surface of the sensor diaphragm is set as a pressure receiving surface for the measuring pressure on the higher pressure side, and the other surface is set as a pressure receiving surface for the measuring pressure on the lower pressure side. Stated in another way, when a surface of the sensor diaphragm to receive the measuring pressure on the higher pressure side is uniquely determined in design, the one surface of the sensor diaphragm is set as the pressure receiving surface for the measuring pressure on the higher pressure side such that the measuring pressure on the higher pressure side is introduced to the non-bonding region inside the first holding member through the pressure introduction hole.

In the pressure sensor chip according to the present disclosure, the first holding member may also include a recess that functions to prevent excessive displacement of the sensor diaphragm when overpressure is applied to the sensor diaphragm. In addition, similarly to the first holding member, the second holding member may include a non-bonding region formed inside the second holding member parallel to the pressure receiving surface of the sensor diaphragm and communicating with a periphery of the pressure introduction hole, and, on an assumption that one side is defined as a direction opposite to the sensor diaphragm with interposition of a plane including the non-bonding region inside the second holding member therebetween and the other side is defined as a direction approaching the sensor diaphragm with interposition of the plane including the non-bonding region inside the second holding member therebetween, third and fourth grooves each having an annular shape and concavely formed in a peripheral edge portion of the non-bonding region inside the second holding member on the one side and the other side, respectively, in continuation with the non-bonding region. Moreover, each of cross-sectional shapes of the third groove and the fourth groove taken perpendicularly to a groove extending direction may include a circular arc, and the third groove and the fourth groove may be formed such that an end of the cross-sectional shape of the fourth groove is positioned closer to the pressure introduction hole than an end of the cross-sectional shape of the third groove.

With those features, regardless of whether which one of the surfaces of the sensor diaphragm is set as the pressure receiving surface for the measuring pressure on the higher pressure side, a gap is prevented from being generated at the diaphragm edge. As a result, generation of stresses attributable to the sensor diaphragm held in the restricted state can be reduced, and concentration of the stresses at the diaphragm edge can be avoided. Moreover, the stresses can be distributed in the annular grooves that are in continuation with the non-bonding region, and distribution of the stresses in the annular grooves can be balanced.

In the pressure sensor chip according to the present disclosure, the non-bonding region inside the first holding member is just required to be a region not bonded, and opposing surfaces defining the non-bonding region may be contacted or not contacted with each other. The non-bonding region is formed, for example, as a region where the opposing surfaces are contacted with each other, but they are not bonded, through a process of roughing those surfaces with the aid of, e.g., plasma or chemical. Alternatively, the non-bonding region may be provided in the form having a small level difference.

Embodiments of the pressure sensor chip according to the present disclosure will be described in detail below with reference to the drawings.

Example 1

Figure 1:
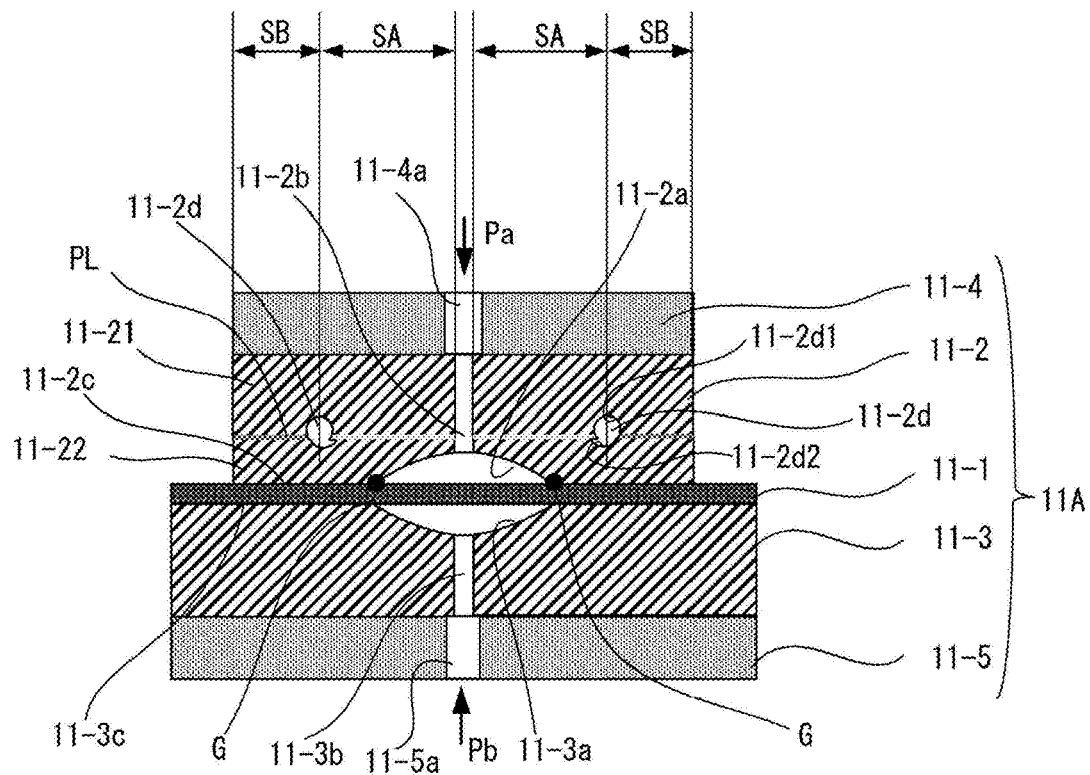
FIG. 1 is a schematic representation of a first embodiment (Example 1) of a pressure sensor chip according to the present disclosure.

FIG. 1 a schematic representation of a first embodiment (Example 1) of the pressure sensor chip according to the present disclosure.

In the pressure sensor chip 11A illustrated in FIG. 1, reference sign 11-1 denotes a sensor diaphragm, 11-2 and 11-3 denote respectively first and second stopper members serving as holding members and bonded to each other with the sensor diaphragm 11-1 interposed therebetween, and 11-4 and 11-5 denote first and second bases bonded to the stopper members 11-2 and 11-3, respectively. The stopper members 11-2 and 11-3 and the bases 11-4 and 11-5 are each made of, e.g., silicon or glass.

In the pressure sensor chip 11A, recesses 11-2a and 11-3a are formed in surfaces of the stopper members 11-2 and 11-3, the surfaces being bonded to one surface and the other surface of the sensor diaphragm 11-1, respectively. The recess 11-2a in the stopper member 11-2 is positioned to face the one surface of the sensor diaphragm 11-1, and the recess 11-3a in the stopper member 11-3 is positioned to face the other surface of the sensor diaphragm 11-1. The recesses 11-2a and 11-3a have curved surfaces (aspherical surfaces) corresponding to displacements of the sensor diaphragm 11-1, and pressure introduction holes (pressure guide holes) 11-2b and 11-3b are formed at the bottoms of the recesses 11-2a and 11-3a, respectively. The recesses 11-2a and 11-3a function to prevent excessive displacements of the sensor diaphragm when overpressure is applied to the sensor diaphragm. Moreover, pressure introduction holes (pressure guide holes) 11-4a and 11-5a are formed in the bases 11-4 and 11-5 at positions corresponding to the pressure introduction holes 11-2b and 11-3b in the stopper members 11-2 and 11-3, respectively.

In the pressure sensor chip 11A, the stopper member 11-2 has therein a non-bonding region SA in communication with a periphery of the pressure introduction hole 11-2b. The non-bonding region SA is provided in part of a plane PL parallel to a pressure receiving surface of the sensor diaphragm 11-1. The non-bonding region SA is formed as a region where opposing surfaces are contacted with each other, but they are not bonded, through a process of roughing those surfaces with the aid of, e.g., plasma or chemical.

In the illustrated example, the stopper member 11-2 is divided two parts at the plane PL parallel to the pressure receiving surface of the sensor diaphragm 11-1. More specifically, one stopper member 11-2 is constituted by bonding two divided stopper members, i.e., one stopper member 11-21 and the other stopper member 11-22, to each other in a region SB of the plane PL where the non-bonding region SA is provided, i.e., in a region of the plane PL except for the non-bonding region SA. Thus, the plane PL parallel to the pressure receiving surface of the sensor diaphragm 11-1 is divided into the non-bonding region SA that is in communication with the periphery of the pressure introduction hole 11-2b, and the non-bonding region SB that is not in communication with the periphery of the pressure introduction hole 11-2b.

Moreover, in the pressure sensor chip 11A, assuming that the side being away from the sensor diaphragm 11-1 in a thickness direction of the stopper member 11-2, i.e., the side in a direction opposite to the sensor diaphragm 11-1 with interposition of the plane including the non-bonding region therebetween, is called one side, and that the side being closer to the sensor diaphragm 11-1 in the thickness direction of the stopper member 11-2, i.e., the side in a direction approaching the sensor diaphragm 11-1 with interposition of the plane including the non-bonding region therebetween, is called the other side, an annular groove 11-2d is formed in an end portion of the non-bonding region SA in a state concavely formed on both the one side and the other side in the thickness direction of the stopper member 11-2. The annular groove 11-2d is not a discretely-separated groove, but it is a continuous groove.

In the annular groove 11-2d, a cross-sectional shape of each of a first groove 11-2d1 and a second groove 11-2d2, which are concavely formed on the one side and the other side, respectively, taken in a direction perpendicular to the non-bonding region SA, i.e., a cross-sectional shape thereof taken perpendicularly to a groove extending direction, includes a circular arc. The first groove 11-2d1 and the second groove 11-2d2 are formed such that an end of the cross-sectional shape of the second groove 11-2d2 is positioned closer to the pressure introduction hole 11-2b than an end of the cross-sectional shape of the first groove 11-2d1.

Figure 2:
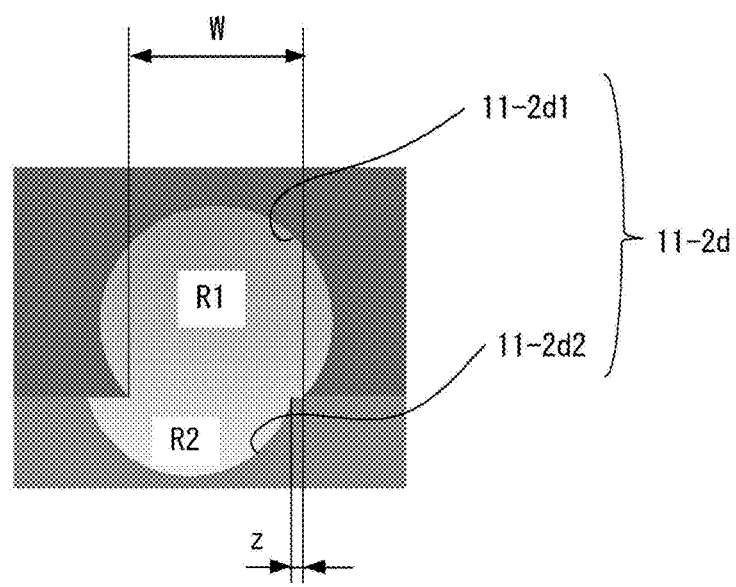
FIG. 2 illustrates sectional shapes of annular grooves inside stopper members of the pressure sensor chip according to Example 1.

In his embodiment, as illustrated in FIG. 2, the cross-sectional shape of the groove 11-2d1 includes a circular arc equal to or greater than a semicircle, and the cross-sectional shape of the groove 11-2d2 includes a circular arc equal to or smaller than a semicircle. Furthermore, curvatures of the cross-sectional shapes of the first groove 11-2d1 and the second groove 11-2d2 are set substantially equal to each other such that stresses generated in the first groove 11-2d1 and the second groove 11-2d2 can be balanced. Moreover, the second groove 11-2d2 of which cross-sectional shape includes the circular arc equal to or smaller than a semicircle is shifted to position closer toward the pressure introduction hole 11-2b (i.e., toward the inner side). Although, in the illustrated example, the curvatures of the cross-sectional shapes of the grooves 11-2d1 and 11-2d2 are set equal to each other, those curvatures are not always required to be equal.

In the pressure sensor chip 11A, assuming that a measuring pressure Pa is defined as measuring pressure on the higher pressure side and a measuring pressure Pb is defined as measuring pressure on the lower pressure side, when the measuring pressure Pa on the higher pressure side is applied to the one surface of the sensor diaphragm 11-1, the sensor diaphragm 11-1 is flexed toward the stopper member 11-3. On that occasion, a force acts on the stopper member 11-2 in a direction opposite to the direction in which the sensor diaphragm 11-1 is flexed, thus causing a gap to be about to generate at a diaphragm edge, e.g., a location denoted by a point G in FIG. 1. It is to be noted that, in the following description, the direction in which the sensor diaphragm 11-1 is flexed in FIG. 1 is called a downward direction, and a direction opposite to the flexing direction is called an upward direction.

In the above case, according to this Example, because the measuring pressure Pa is introduced to the non-bonding region SA as well, which is provided inside the stopper member 11-2, through the pressure introduction hole 11-2b, the non-bonding region SA provides a pressure receiving surface for the measuring pressure Pa, thereby suppressing the force acting on the stopper member 11-2 in the upward direction and preventing a gap from being generated at the diaphragm edge. As a result, generation of the stresses attributable to the sensor diaphragm 11-1 held in the restricted state is reduced, and concentration of the stresses at the diaphragm edge is avoided.

In the pressure sensor chip 11A, the non-bonding region SA develops a more significant effect when overpressure is further increased after the sensor diaphragm 11-1 has contacted the bottom of the recess 11-3a in the stopper member 11-3.

Figure 3:
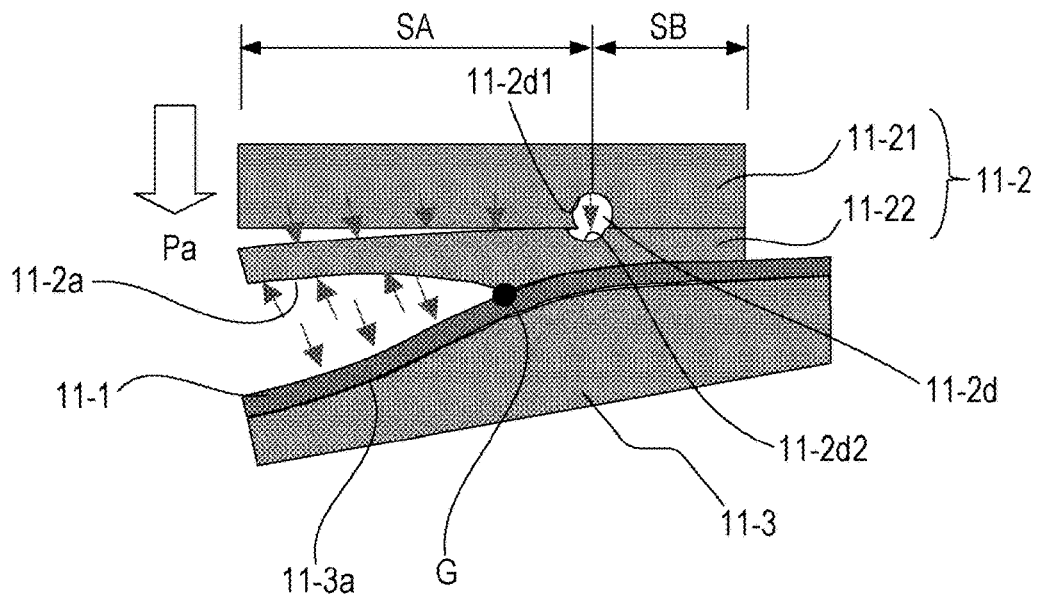
FIG. 3 illustrates a state where a sensor diaphragm has contacted the bottom of a recess in the stopper member of the pressure sensor chip according to Example 1.

FIG. 3 illustrates a state where the sensor diaphragm 11-1 has contacted the bottom of the recess 11-3a in the stopper member 11-3. When overpressure is applied to the one surface of the sensor diaphragm 11-1, the sensor diaphragm 11-1 is flexed toward the stopper member 11-3 to come into contact with the bottom of the recess 11-3a in the stopper member 11-3. When the overpressure is further increased after the sensor diaphragm 11-1 has contacted the bottom of the recess 11-3a, the stopper member 11-2 is deformed by the force acting on the stopper member 11-2 in the upward direction, thus causing a gap to be about to generate at the diaphragm edge.

In the above case, according to this Example, since the overpressure is introduced to the non-bonding region SA as well, which is provided inside the stopper member 11-2, through the pressure introduction hole 11-2b, the non-bonding region SA provides an overpressure receiving surface and applies a force acting on the stopper member 11-22 in the downward direction, thereby suppressing the deformation of the stopper member 11-22 or deforming it in the opposite direction. In the example illustrated in FIG. 3, the stopper member 11-22 is deformed in the downward direction following the deformation of the diaphragm 11-1 in the downward direction.

As a result, even when the overpressure is further increased after the sensor diaphragm 11-1 has contacted the bottom of the recess 11-3a in the stopper member 11-3, any gap is not generated at the diaphragm edge, and the concentration of the stresses at the diaphragm edge is avoided. Hence the expected withstanding pressure is ensured.

Moreover, according to this Example, since the annular groove 11-2d is formed in a peripheral edge portion of the non-bonding region SA in the state concavely formed on both the one side and the other side in the thickness direction of the stopper member 11-2, stresses are distributed in the annular groove 11-2d positioned in the end portion of the non-bonding region SA, i.e., in the annular groove 11-2d formed in continuation with the non-bonding region SA. Hence the withstanding pressure can be further increased.

In addition, according to this Example, since the first groove 11-2d1 and the second groove 11-2d2 are concavely formed on the one side and the other side, respectively, such that the end of the cross-sectional shape of the second groove 11-2d2 is positioned closer to the pressure introduction hole 11-3b than the end of the cross-sectional shape of the first groove 11-2d1, distribution of the stresses in the annular groove 11-2d is balanced by appropriately setting an amount of the shift between the first groove 11-2d1 and the second Groove 11-2d2. As a result, a maximum level of the generated stresses can be suppressed, and the withstanding pressure can be further increased.

Figure 4:
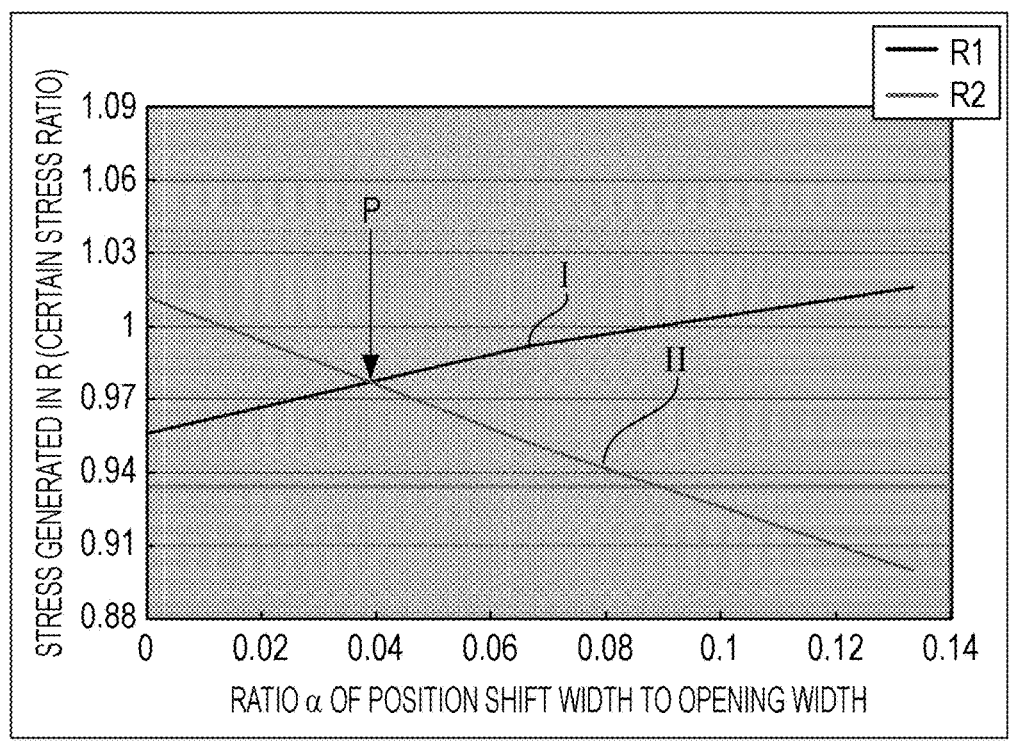
FIG. 4 is a graph depicting, by way of example, a relation between a ratio of a position shift width to an opening width of the annular groove and each of stress generated in R1 and stress generated in R2 under constant pressure.
Figure 5:
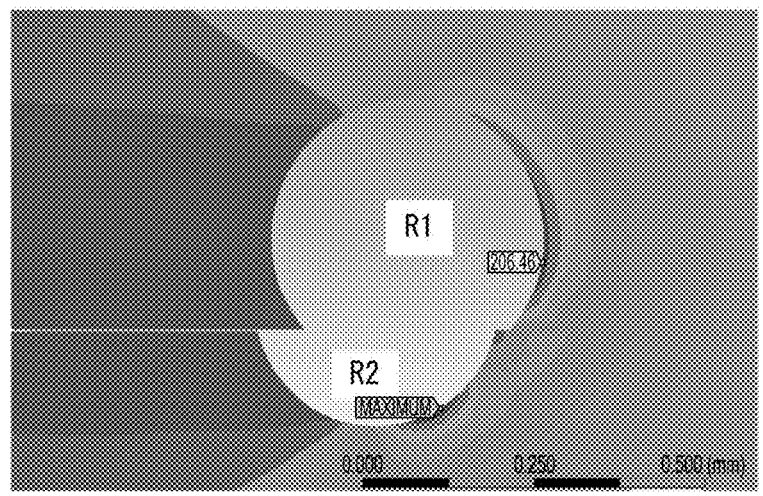
FIG. 5 is a graph depicting distributions of the stress generated in R1 and the stress generated in R2 in a visually understandable manner.

Assuming that the cross-sectional shape of the first groove 11-2d1 is denoted by R1, the cross-sectional shape of the second groove 11-2d2 is denoted by R2, and a ratio of a position shift width z between the first groove 11-2d1 and the second groove 11-2d2 (i.e., an R-position shift width z) to an opening width W of the first groove 11-2d1 (see FIG. 2) is denoted by α, FIG. 4 depicts, by way of example, a relation between the ratio α of the R-position shift width to the opening width and each of stress I generated in R1 and stress II generated in R2 under constant pressure. In FIG. 4, a horizontal axis represents the ratio α of the position shift width to the opening width, and a vertical axis represents a stress ratio between the stresses generated in R1 and R2 (called in-R generated stresses). In the depicted example, the stress generated in R1 and the stress generated in R2 are balanced at a point P, namely when the ratio α of the position shift width to the opening width is 0.04. FIG. 5 depicts distributions of the stress generated in R1 and the stress generated in R2 in a visually understandable manner. Areas where the stresses generated in R1 and R2 are relatively high are indicated by darker tones.

Moreover, according to this Example, with the feature that the cross-sectional shape of the first groove 11-2d1 concavely formed on the one side includes the circular arc equal to or greater than a semicircle and the cross-sectional shape of the second groove 11-2d2 concavely formed on the other side includes the circular arc equal to or smaller than a semicircle, a thickness of the stopper member 11-22 is decreased, and an following effect of the stopper member 11-22 is enhanced. It is hence possible to decrease the thickness of the stopper member 11-2, to reduce an area of the non-bonding region SA inside the stopper member 11-2, thereby reducing sizes in the vertical and horizontal directions, and to realize size reduction of the chip.

Figure 6:
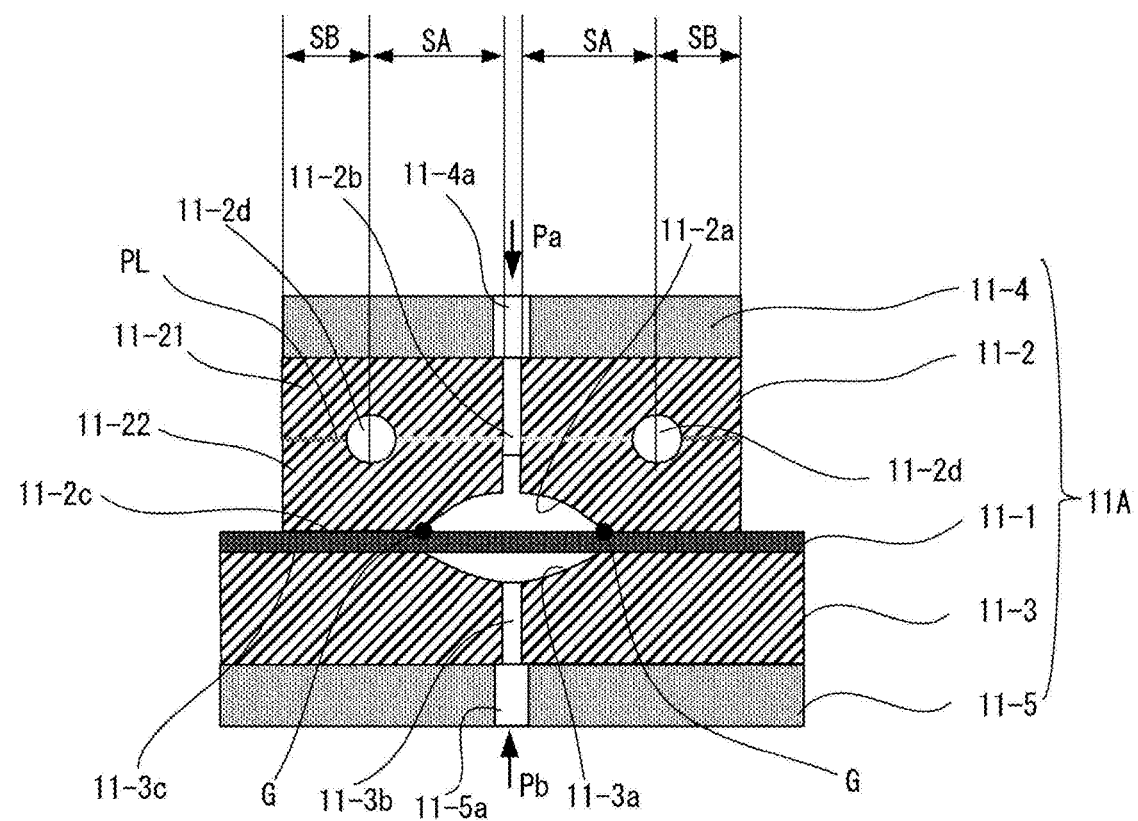
FIG. 6 is a schematic representation of a pressure sensor in which the annular groove has a circular sectional shape.

It is conceivable on trial that the cross-sectional shape of the annular groove 11-2d is set to be circular, for example, as illustrated in FIG. 6. In the case of the cross-sectional shape of the annular groove 11-2d being circular, however, it is necessary to increase the diameter of the circle, or to form an annular groove having a cross-sectional shape greater than a semicircle, like R1 in FIG. 5, in each of the stopper members 11-21 and 11-22 for the purpose of obtaining a sufficient distribution effect. This results in that a groove depth in the thickness direction of the stopper member is increased, and that the thicknesses of both the stopper members 11-21 and 11-22 have to be increased. Moreover, in order to ensure the following effect of the stopper member 11-22, the area of the non-bonding region SA inside the stopper member 11-2 has to be increased corresponding to the increase in the thickness of the stopper member 11-22. Such an increase in the pressure receiving area increases the stress generated in the annular groove 11-2d, and hence causes reduction of the withstanding pressure. In other words, to ensure the desired withstanding pressure, the cross-sectional shape of the annular groove 11-2d is needed to have a larger circle and the chip size is inevitably increased, thus falling in a vicious cycle.

In contrast, in this Example, with the features that the cross-sectional shape of the first groove 11-2d1 concavely formed on the one side includes the circular arc equal to or greater than a semicircle and the cross-sectional shape of the second groove 11-2d2 concavely formed on the other side includes the circular arc equal to or smaller than a semicircle, and that opposing ends of the circular arcs of the grooves 11-2d1 and 11-2d2 are shifted from each other with the end of the circular arc of the groove 11-2d2 being positioned on the inner side, the curvature of the circular arc can be substantially increased without increasing the diameter of the circle in the thickness direction of the stopper member 11-22, and hence the stress distribution effect in the annular groove 11-2d can be increased. Furthermore, since the cross-sectional shape of the second groove 11-2d2 concavely formed in the thickness direction of the stopper member 11-22 equal to or smaller than a semicircle, the thickness of the stopper member 11-22 can be decreased. As a result, it is possible to enhance the following effect of the stopper member 11-22 without increasing the area of the non-bonding region SA, to reduce the chip size, and to ensure higher withstanding pressure.

Figure 7:
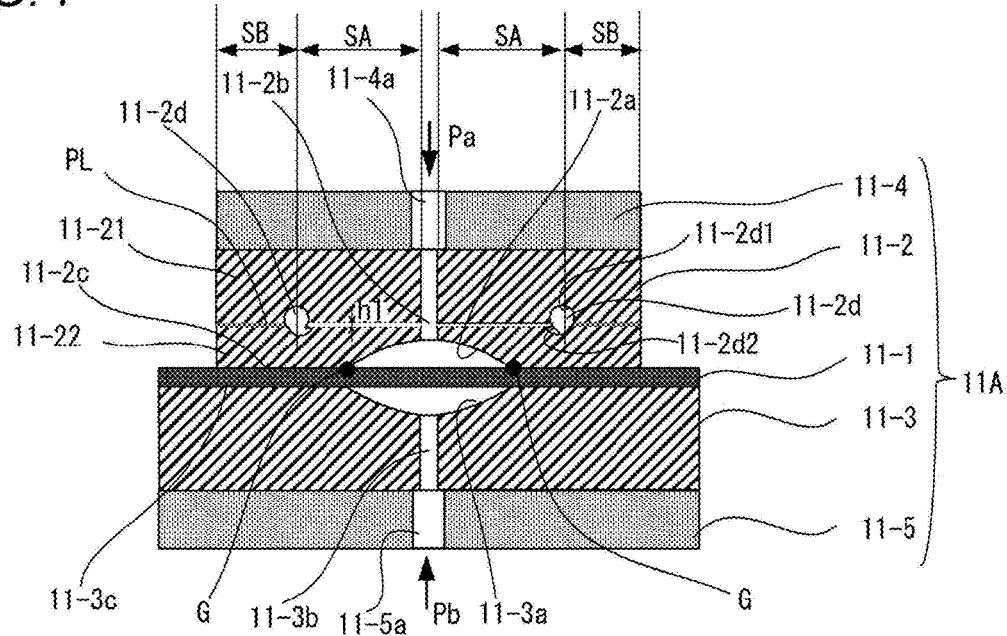
FIG. 7 illustrates an example in which a non-bonding region inside the stopper member has a small level difference.

While, in this Example, the non-bonding region SA inside the stopper member 11-2 is formed through a process of roughing the opposing surfaces with the aid of, e.g., plasma or chemical, the non-bonding region SA may be provided in the form having a small level difference h1 as illustrated in FIG. 7.

Example 2

Figure 8:
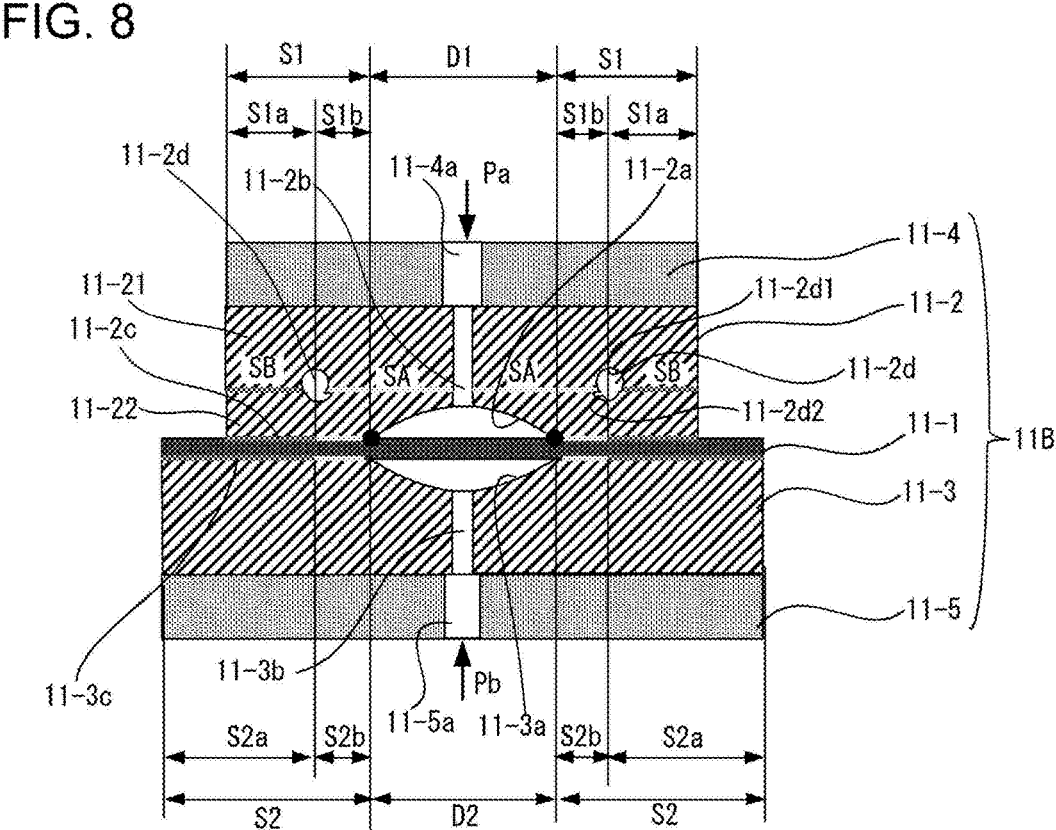
FIG. 8 is a schematic representation of a second embodiment (Example 2) of the pressure sensor chip according to the present disclosure.

FIG. 8 is a schematic representation of a second embodiment (Example 2) of the pressure sensor chip according to the present disclosure. As in the pressure sensor chip 11A of Example 1, a pressure sensor chip 11B of Example 2 includes, inside the stopper member 11-2, the non-bonding region SA and the annular groove 11-2d in continuation with the non-bonding region SA. However, the pressure sensor chip 11B of Example 2 is different from the pressure sensor chip 11A of Example 1 in the following points.

In the pressure sensor chip 11B, a region S1 in a peripheral portion 11-2c of the stopper member 11-2, the region S1 facing the one surface of the sensor diaphragm 11-1, includes a region S1a on the outer peripheral side and a region S1b on the inner peripheral side. The region S1a on the outer peripheral side is a region bonded to the one surface of the sensor diaphragm 11-1, and the region S1b on the inner peripheral side is a region not bonded to the one surface of the sensor diaphragm 11-1.

Furthermore, a region S2 in a peripheral portion 11-3c of the stopper member 11-3, the region S2 facing the other surface of the sensor diaphragm 11-1, includes a region S2a on the outer peripheral side and a region S2b on the inner peripheral side. The region S2a on the outer peripheral side is a region bonded to the other surface of the sensor diaphragm 11-1, and the region S2b on the inner peripheral side is a region not bonded to the other surface of the sensor diaphragm 11-1.

The outer peripheral region S1a in the peripheral portion 11-2c of the stopper member 11-2 is directly bonded to the one surface of the sensor diaphragm 11-1 to serve as a bonding region, and the outer peripheral region S2a in the peripheral portion 11-3c of the stopper member 11-3 is directly bonded to the other surface of the sensor diaphragm 11-1 to serve as a bonding region.

The inner peripheral region S1b in the peripheral portion 11-2c of the stopper member 11-2 serves as a non-bonding region where a surface defining the inner peripheral region S1b is contacted with the one surface of the sensor diaphragm 11-1, but it is not bonded thereto, through a process of roughing the surface with the aid of, e.g., plasma or chemical. The inner peripheral region S2b in the peripheral portion 11-3c of the stopper member 11-3 also serve as a non-bonding region where a surface defining the inner peripheral region S2b is contacted with the other surface of the sensor diaphragm 11-1, but it is not bonded thereto, through a process of roughing the surface with the aid of, e.g., plasma or chemical. Alternatively, the inner peripheral region S1b in the peripheral portion 11-2c of the stopper member 11-2 and the inner peripheral region S2b in the peripheral portion 11-3c of the stopper member 11-3 may be each formed by leaving a small gap such that the surface defining the inner peripheral region is not contacted with the surface of the sensor diaphragm 11-1.

In the pressure sensor chip 11B, a region in the lower surface of the sensor diaphragm 11-1 inner than the non-bonding region S1b serves as a pressure sensitive region D1 of the diaphragm. Similarly, a region in the upper surface of the sensor diaphragm 11-1 inner than the non-bonding region S2b serves as a pressure sensitive region D2 of the diaphragm. In the pressure sensitive region D1 of the diaphragm, one measuring pressure Pa is applied to the surface of the diaphragm opposing to the stopper member 11-2. In the pressure sensitive region D2 of the diaphragm, the other measuring pressure Pb is applied to the surface of the diaphragm opposing to the stopper member 11-3. Diameters of the pressure sensitive regions D1 and D2 define an effective diameter of the diaphragm.

In the pressure sensor chip 11B, assuming that the measuring pressure Pa is the measuring pressure on the higher pressure side and the measuring pressure Pb is measuring pressure on the lower pressure side, when the measuring pressure Pa on the higher pressure side is applied to the pressure sensitive region D1 in the upper surface of the sensor diaphragm 11-1, the sensor diaphragm 11-1 can be flexed without generating an excessive tensile force, which is attributable to the stopper member 11-2 holding the sensor diaphragm 11-1 in the restricted state, with the presence of the non-bonding region S1b that is not bonded to the peripheral portion 11-2c of the stopper member 11-2. Accordingly, the stress generated in a portion of the stopper member 11-2 corresponding to the non-bonding region S1b is reduced.

In the pressure sensor chip 11B, assuming that the measuring pressure Pb is the measuring pressure on the higher pressure side and the measuring pressure Pa is the measuring pressure on the lower pressure side, when the measuring pressure Pb on the higher pressure side is applied to the pressure sensitive region D2 in the lower surface of the sensor diaphragm 11-1, the sensor diaphragm 11-1 can be flexed without generating an excessive tensile force, which is attributable to the stopper member 11-3 holding the sensor diaphragm 11-1 in the restricted state, with the presence of the non-bonding region S2b that is not bonded to the peripheral portion 11-3c of the stopper member 11-3.

Accordingly, the stress generated in a portion of stopper member 11-3 corresponding to the non-bonding region S2*b* is reduced.

Example 3

Figure 9:
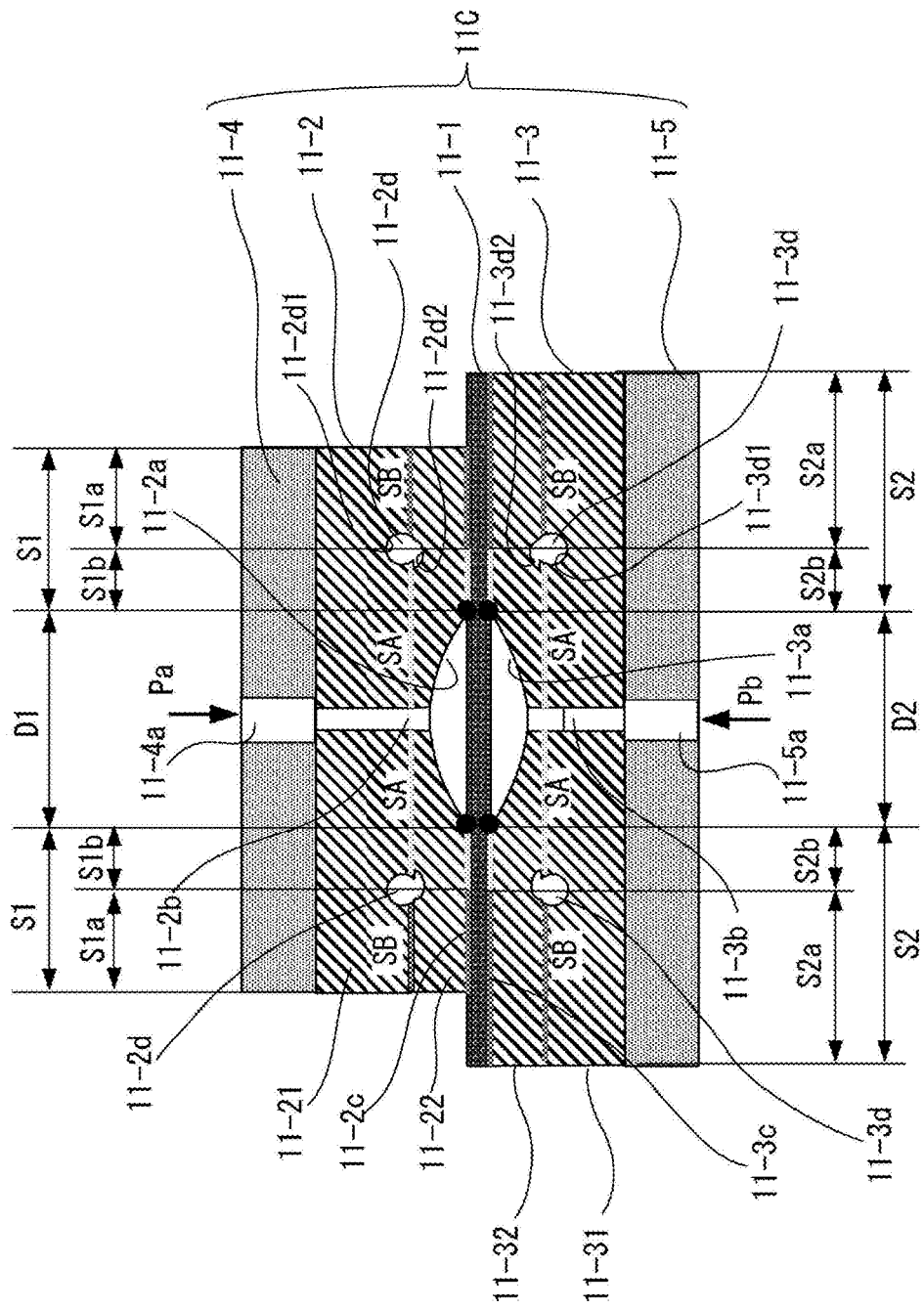
FIG. 9 is a schematic representation of a third embodiment (Example 3) of the pressure sensor chip according to the present disclosure.
Figure 10:
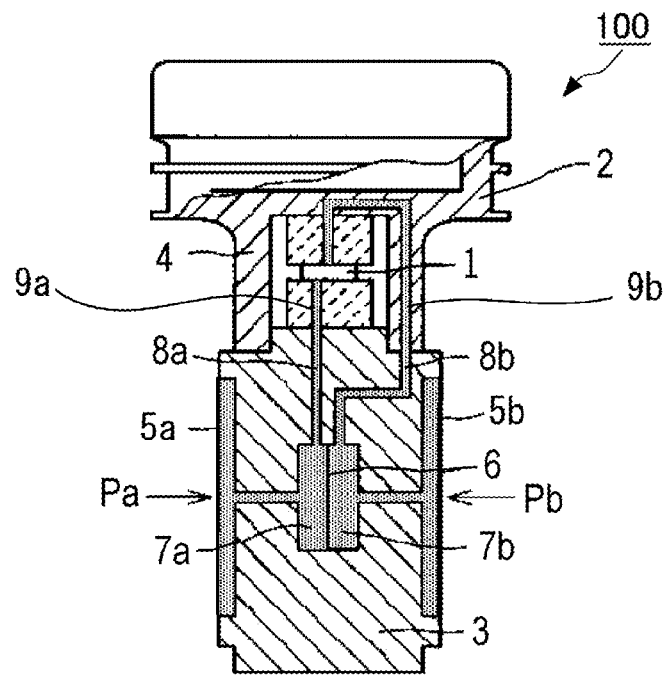
FIG. 10 illustrates a structure of a related-art differential pressure sensor in a schematic form.
Figure 11A:
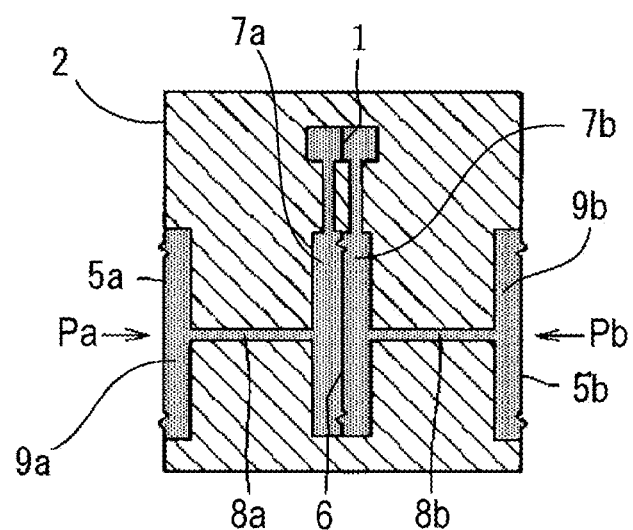
FIG. 11A schematically illustrates an operation mode of the related-art differential pressure sensor.
Figure 11B:
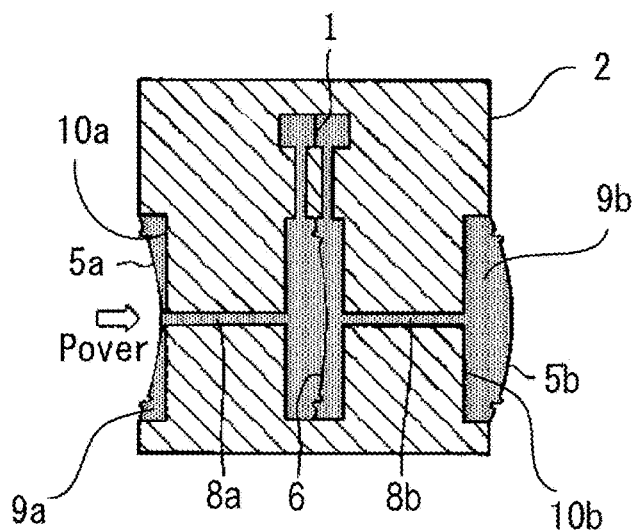
FIG. 11B schematically illustrates an operation mode of the related-art differential pressure sensor.

FIG. 9 is a schematic representation of a third embodiment (Example 3) of the pressure sensor chip according to the present disclosure.

In the examples illustrated in FIGS. 1, 7 and 8, the non-bonding region SA is provided only inside the stopper member 11-2. In an alternative example, however, like a pressure sensor chip 11C of Example 3 illustrated in FIG. 9, another non-bonding region SA may be provided inside the stopper member 11-3, and an annular groove 11-3*d* may be formed in continuation with the other non-bonding region SA.

In the pressure sensor chip 11C of Example 3, the annular groove 11-2*d* formed inside the stopper member 11-2 and the annular groove 11-3*d* formed inside the stopper member 11-3 have the same cross-sectional shape, and they are formed at positions aligned in an opposing relation. However, the cross-sectional shapes of the annular grooves 11-2*d* and 11-3*d* may be different from each other, and horizontal positions of the annular grooves 11-2*d* and 11-3*d* may be different from each other. Moreover, the cross-sectional shapes of the annular grooves 11-2*d* and 11-3*d* may be modified to have suitable one of various shapes including, e.g., elliptic shapes shifted from each other.

In the pressure sensor chip 11C of Example 3 as well, the non-bonding region SA inside each of the stopper members 11-2 and 11-3 may be provided in the form having a small level difference. In such a case, however, a size of the level difference is preferably set to be not so large. The reason is as follows. In the case where the non-bonding region SA inside the stopper member 11-2, for example, is provided in the form having a small level difference, there is no significant problem even with the level difference having a large size, when the measuring pressure Pa is set to be applied on the higher pressure side. However, when the measuring pressure Pb is set to be applied on the higher pressure side, the sensor diaphragm 11-1 is brought into contact with the bottom surface of the recess 11-2*a*, and upon further application of pressure, the stopper member 11-22 is deformed with the presence of a gap corresponding to the level difference. Thus, the stress generated at the diaphragm edge is increased. In that case, the size of the level difference is set depending on a force tending to move the stopper member 11-2 upward. The above discussion is similarly applied to the case where the non-bonding region SA inside the stopper member 11-3 is provided in the form having a small level difference.

In the examples illustrated in FIGS. 1, 7 and 8, the recess 11-2*a* having an aspherical surface is provided inside the stopper member 11-2. However, the stopper member 11-2 is not always required to include the recess 11-2*a* having an aspherical surface, and the stopper member 11-2 may be a simple holding member just for holding the sensor diaphragm 11-1. Even in such a case, a non-bonding region provided in the holding member can provide a pressure receiving surface that applies a force acting in a direction opposite to the direction in which the sensor diaphragm 11-1 is flexed.

While, in Examples described above, while the pressure sensor chip is of the type that a resistance strain gauge exhibiting a resistance value changed depending on pressure change is formed on the sensor diaphragm 11-1, it may be a sensor chip of the electrostatic capacitance type. The sensor chip of the electrostatic capacitance type includes a substrate including a predetermined space (capacitance chamber), a diaphragm arranged over the space in the substrate, a stationary electrode formed on the substrate, and a movable electrode formed on the diaphragm. When the diaphragm is deformed upon receiving pressure, a distance between the movable electrode and the stationary electrode is chanced, and electrostatic capacitance between both the electrodes is changed.

Extension of Examples

The present disclosure has been described above with reference to Examples, but the present disclosure is not limited to above Examples. Basic features and details of the present disclosure can be modified in various ways understandable by those skilled in the art without departing from the scope of the technical concept of the present disclosure. Moreover, above Examples can be implemented in modes optionally combined with each other within the scope not causing contradictions.

INDUSTRIAL APPLICABILITY

The pressure sensor chip according to the present disclosure can be used in various applications, such as a field of differential pressure sensors for industrial purposes.

REFERENCE SIGNS LIST

11A to 11C . . . pressure sensor chip, 11-1 . . . sensor diaphragm, 11-2 (11-21, 11-22), 11-3 . . . stopper member, 11-2*a*, 11-3*a* . . . recess, 11-2*b*, 11-3*b* . . . pressure introduction hole (pressure guide hole), 11-2*c*, 11-3*c* . . . peripheral portion, 11-2*d*, 11-3*d* . . . annular groove, 11-2*d*1, 11-3*d*1 . . . groove on one side, 11-2*d*2, 11-3*d*2 . . . groove on the other side, 11-4, 11-5 . . . base, 11-4*a*, 11-5*a* . . . pressure introduction hole (pressure guide hole), SA . . . non-bonding region, SB . . . bonding region, S1*a*, S2*a* . . . region on outer peripheral side (bonding region), S1*b*, S2*b* . . . region on inner peripheral side (non-bonding region), D1, D2 . . . pressure sensitive region, and PL . . . plane.

The invention claimed is:

1. A pressure sensor chip, comprising:
a sensor diaphragm that outputs a signal depending on a difference between pressures received by a first surface and a second surface of the sensor diaphragm; and
a first holding member and a second holding member bonded respectively to the first surface and the second surface of the sensor diaphragm with peripheral portions thereof being positioned to face each other, each of the first holding member and the second holding member having a respective pressure introduction hole through which pressure to be measured is applied to the sensor diaphragm, wherein
the first holding member includes a non-bonding region formed inside the first holding member, the non-bonding region being parallel to a pressure-receiving surface of the sensor diaphragm and communicating with a periphery of the pressure introduction hole of the first holding member,
defining a first side of a plane including the non-bonding region inside the first holding member as a direction opposite to the sensor diaphragm with interposition of the plane including the non-bonding region inside the first holding member therebetween and a second side of the plane including the non-bonding region inside the first holding member as a direction approaching the sensor diaphragm with interposition of the plane including the non-bonding region inside the first holding member therebetween, the first holding member includes first and second grooves each having an annular shape and concavely formed in a peripheral edge portion of the non-bonding region inside the first holding member on the first side and the second side of the plane including the non-bonding region inside the first holding member, respectively, in continuation with the non-bonding region, each of cross-sectional shapes of the first groove and the second groove taken perpendicularly to a groove-extending direction includes a circular arc, the first groove and the second groove are formed such that an end of the cross-sectional shape of the second groove is positioned closer to the pressure introduction hole of the first holding member than an end of the cross-sectional shape of the first groove, and the second holding member includes a recess formed in a surface thereof, the surface being bonded to the second surface of the sensor diaphragm.

2. The pressure sensor chip according to claim 1, wherein the cross-sectional shape of the first groove taken perpendicularly to the groove-extending direction includes a first circular arc having a first angular range equal to or greater than a semicircle, and the cross-sectional shape of the second groove taken perpendicularly to the groove-extending direction includes a second circular arc having a second angular range equal to or smaller than the semicircle.

3. The pressure sensor chip according to claim 1, wherein the first holding member is divided into two parts at the plane including the non-bonding region and being parallel to the pressure receiving surface of the sensor diaphragm, and the two divided parts of the first holding member are bonded to each other at surfaces thereof, along which the non-bonding region is provided, in all regions except for the non-bonding region.

4. The pressure sensor chip according to claim 3, wherein, in the non-bonding region, the two divided parts of the first holding member contact each other and are not bonded to each other.

5. The pressure sensor chip according to claim 3, wherein the non-bonding region is formed through a process of roughing surfaces of the two divided parts of the first holding member in the non-bonding region with one of a plasma and a chemical.

6. The pressure sensor chip according to claim 3, wherein there is a level difference between the surfaces of the two divided parts of the first holding member.

7. The pressure sensor chip according to claim 1, wherein the first surface of the sensor diaphragm serves as a pressure-receiving surface for pressure to be measured on a higher pressure side, and the second surface of the sensor diaphragm serves as a pressure-receiving surface for pressure to be measured on a lower pressure side.

8. The pressure sensor chip according to claim 1, wherein the first holding member includes a recess formed in a surface thereof, the surface being bonded to the first surface of the sensor diaphragm, the second holding member includes a non-bonding region formed inside the second holding member parallel to the pressure receiving surface of the sensor diaphragm and communicating with a periphery of the pressure introduction hole of the second holding member, defining a first side of a plane including the non-bonding region inside the second holding member as a direction opposite to the sensor diaphragm with interposition of the plane including the non-bonding region inside the second holding member therebetween and a second side of the plane including the non-bonding region inside the second holding member as a direction approaching the sensor diaphragm with interposition of the plane including the non-bonding region inside the second holding member therebetween, the second holding member includes third and fourth grooves each having an annular shape and concavely formed in a peripheral edge portion of the non-bonding region inside the second holding member on the first side and the second side of the plane including the non-bonding region inside the second holding member, respectively, in continuation with the non-bonding region, each of cross-sectional shapes of the third groove and the fourth groove taken perpendicularly to a groove-extending direction includes a circular arc, and the third groove and the fourth groove are formed such that an end of the cross-sectional shape of the fourth groove is positioned closer to the pressure introduction hole of the second holding member than an end of the cross-sectional shape of the third groove.

9. The pressure sensor chip according to claim 1, wherein the end of the cross-sectional shape of the second groove is one of two points defined by where the plane including the non-bonding region and the circular arc of the second groove cross that is closer to the pressure introduction hole of the first holding member, and the end of the cross-sectional shape of the first groove is one of two points defined by where the plane including the non-bonding region and the circular arc of the first groove cross that is closer to the pressure introduction hole of the first holding member.

10. The pressure sensor chip according to claim 1, wherein each of the first groove and the second groove is a continuous groove and not a discretely-separated groove.

11. The pressure sensor chip according to claim 1, wherein curvatures of the cross-sectional shapes of first groove and the second groove are substantially equal.

12. The pressure sensor chip according to claim wherein a surface of the first holding member bonded to the first surface of the sensor diaphragm includes a first region on an outer peripheral side and a second region on and inner peripheral side with respect to the pressure introduction hole, and the second region is a non-bonding region.

13. The pressure sensor chip according to claim 1, wherein a surface of the second holding member bonded to the second surface of the sensor diaphragm includes a first region on an outer peripheral side and a second region on an inner peripheral side with respect to the pressure introduction hole of the second holding member, and the second region is a non-bonding region.

* * * * *